United States Patent [19]

Clement

[11] 4,400,119
[45] Aug. 23, 1983

[54] TWIST DRILL

[76] Inventor: Burke Clement, 7823 Gleason Rd., Apt. 1214, Knoxville, Tenn. 37919

[21] Appl. No.: 291,640

[22] Filed: Aug. 10, 1981

[51] Int. Cl.³ .............................................. B23B 51/02
[52] U.S. Cl. ..................................... 408/230; 408/223
[58] Field of Search .............. 408/210, 213, 230, 223, 408/715

[56] References Cited

U.S. PATENT DOCUMENTS

| 2,576,664 | 11/1951 | Berlien | 408/230 |
| 2,646,701 | 7/1953 | Letien | 408/223 |
| 2,667,795 | 2/1954 | Bowen | 408/233 |
| 3,237,488 | 3/1966 | Parone et al. | 408/230 |
| 3,765,789 | 10/1973 | Hougen | 408/204 |
| 3,824,026 | 7/1974 | Gaskins | 408/210 |
| 3,977,807 | 8/1976 | Siddall | 408/230 X |
| 4,231,692 | 11/1980 | Brabetz et al. | 408/230 |

FOREIGN PATENT DOCUMENTS

| 340505 | 5/1936 | Italy | 408/230 |
| 286458 | 1/1971 | U.S.S.R. | 408/210 |
| 313976 | 12/1971 | U.S.S.R. | 408/210 |
| 561630 | 6/1977 | U.S.S.R. | 408/230 |
| 674840 | 7/1979 | U.S.S.R. | 408/230 |

*Primary Examiner*—William R. Briggs
*Attorney, Agent, or Firm*—Pitts, Ruderman & Kesterson

[57] ABSTRACT

An improved twist drill (20) is provided which includes at least one spiral groove (42) which extends from the leading face of a cutting edge of a tip portion of the drill. This groove is positioned at a spaced location from the cutting lip (40) and extends to the trailing face of the cutting blade tip such that a portion of the material to be drilled initially passes through the spiral groove during the drilling operation as the drill is fed into the work piece. The portion of the material which passes through the groove is at least partially cut by a subsequent pass of the cutting edge of the further cutting blade tip and causes shavings of the material to be broken into smaller sizes thereby enhancing the travel of the shavings along the length of the flutes and reducing the binding forces applied to the twist drill during drilling operations.

6 Claims, 7 Drawing Figures

U.S. Patent     Aug. 23, 1983     4,400,119
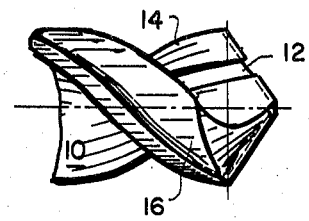
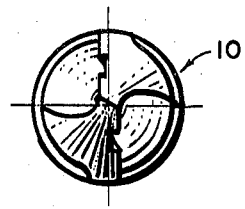
FIG.IA     FIG.IB
PRIOR ART
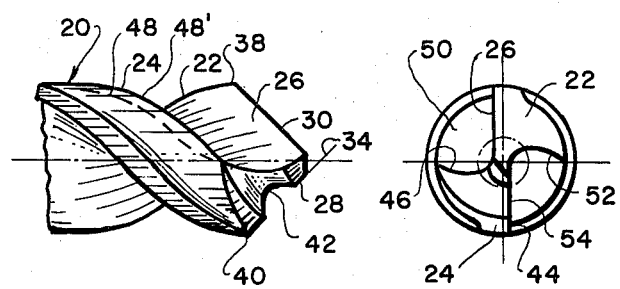
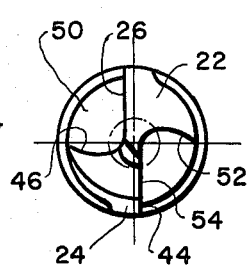
FIG.2     FIG.3
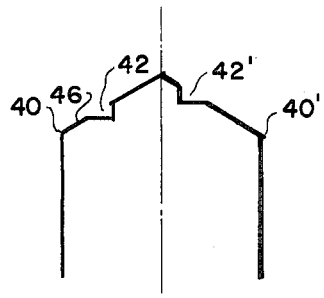
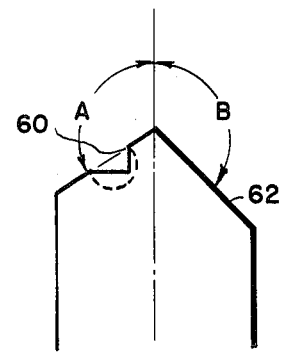
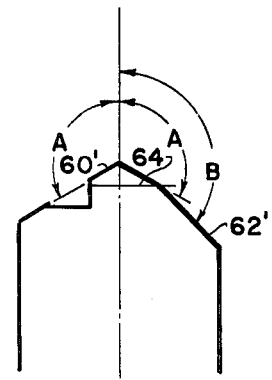
FIG.4     FIG.5     FIG.6

TWIST DRILL

DESCRIPTION

1. Technical Field

This invention relates to a twist drill which drills holes in a work piece into which the drill is fed. In this particular invention, the drill includes at least one spiral groove which extends from the leading face to the trailing face of the tip portion of the cutting blades.

2. Background Art

Various types of twist drills are known in the prior art. One such twist drill is disclosed in the U.S. Pat. No. 2,646,701. This twist drill includes the improvement comprising the provision of longitudinal grooves which extend along the length of the face of the cutting blade commencing at the tip portion of the blade and continuing to the shank of the drill. These grooves form a second cutting edge which contacts the work piece. The grooves are rectangular in cross-sectional outline and intersect the mating cutting edge of the cutting blade.

The twist drills of known prior art design suffer certain advantages. For example, twist drills tend to overheat during drilling operations which causes an expansion of the twist drill material resulting in additional binding forces being applied by the work piece against the cutting edges. This attenuates the speed which the twist drill can be fed into the work piece and also increases the wear on the drill itself.

Twist drills also create shavings during the drilling operation which normally move from the tip to the shank of the drill through the flutes. The shaving sizes are related to the width of the leading cutting edge of the tip portion of the drill and can assume substantially large lengths with respect to the length of the drill. These shavings, particularly large shavings generated by certain conventional twist drills, can become bound within the twist drill flutes between the twist drill and the wall of the bore in the work piece. Such bound shavings increase the work required to drill a hole and also reduce the useful life of the drill.

Therefore, it is an object of the present invention to provide an improved twist drill. Another object of the invention is to provide a twist drill which incorporates a groove on the tip portion thereof which extends from the leading face to the trailing face of the tip portion of at least one of the cutting blades such that material being cut from the work piece initially passes through this groove prior to its being cut by the pass of the trailing cutting blade. In this connection, the shaving sizes are reduced and this feature can also be used to assist in equalizing the work done by the leading and trailing cutting blades.

Still a further object of the present invention is to provide an improved twist drill in which the cutting edge of one of the blades forms an obtuse angle with the longitudinal axis of the drill which is greater than the angle formed by the further cutting edge of the further cutting blade.

DISCLOSURE OF THE INVENTION

Other objects and advantages will in part be obvious and will in part appear hereinafter and will be accomplished by the present invention which provides an improved twist drill. The twist drill of the present invention includes at least one spiral groove which extends from the leading face of each cutting edge of the tip portion of the drill. This groove is positioned at a spaced location from the cutting lip and extends to the trailing face of the cutting blade tip. The portion of the material to be drilled initially passes through the spiral groove during the drilling operation as the drill is fed into such material. A portion of the material which passes through the groove is at least partially cut by the subsequent pass of the cutting edge of the further cutting blade tip which causes shavings to be broken into smaller sizes than would normally be cut in the absence of such grooves. The small sized shavings assist in reducing the binding forces applied to the twist drill during the drilling operation and also tend to reduce the heat generated during such operations. In one embodiment, the slope of the leading cutting edge of the tip portion of one of the cutting blades forms a greater obtuse angle with the longitudinal axis of the twist drill than the slope of the leading cutting edge of the further cutting blade. The cutting edge forming the greater obtuse angle is the trailing edge and the cutting edge forming the lesser angle is the leading cutting edge which normally cuts shavings from the material of a work piece initially. In one embodiment, the spiral groove is defined in the leading cutting edge and its associated blades.

BRIEF DESCRIPTION OF THE DRAWINGS

The above-mentioned features will become more clearly understood when the following detailed description of the invention is read together with the drawings in which:

FIGS. 1A and 1B illustrate prior art twist drills.

FIG. 2 illustrates a twist drill constructed in accordance with various features of the present invention.

FIG. 3 illustrates an end view looking directly into the tip along an extended longitudinal axis of said twist drill.

FIG. 4 illustrates a traverse cross-sectional outline of a twist drill incorporating various features of the present invention and includes a pair of staggered grooves.

FIG. 5 illustrates a twist drill incorporating a single spherical groove on the tip portion of the drill and has a leading cutting edge which forms an obtuse angle with longitudinal axis of the twist drill which is less than the obtuse angle formed by the trailing edge and the longitudinal axis of the twist drill.

FIG. 6 illustrates a further embodiment of a twist drill in which the terminal tip portion of the drill is symmetric about the longitudinal axis of the drill and in which a portion of the trailing edge forms greater obtuse angle with the longitudinal axis of the twist drill than the leading edge.

BEST MODE FOR CARRYING OUT THE INVENTION

Referring now to the drawings, a prior art twist drill is indicated generally at 10 in FIGS. 1A and 1B. These figures illustrate the provision of a groove 12 which extends longitudinally along the length of the leading faces of the cutting blade 14 and 16. These grooves are designed to increase the contact points between the cutting blades and the work piece material.

A twist drill constructed in accordance with the various features of the present invention is illustrated in a partial elevation view in FIG. 2. This twist drill is generally referred to at 20 and includes a pair of spiral cutting blades 22 and 24. These spiral cutting blades commence at the shank (not shown) of the twist drill and continue until they are tapered down at the tip portion 26 of the twist drill. Each of the cutting blades 22 and 24 define a cutting edge 28 and 30, respectively on the leading face of the cutting blades at the tapered tip portion. These cutting edges extend from the central web 34, at the apex of the tip which joins the tapered leading face to the tapered trailing face of the respective annularly spaced blade, to the respective cutting lip 40 which defines the juncture at which the spiral cutting blades begin to be tapered to form the tip portion of the twist drill.

As illustrated in FIGS. 2 and 3, in one embodiment of the present invention, a spiral groove generally indicated at 42 extends from the leading face 44 of the cutting blade 24 to the trailing face 46 of this cutting blade. As indicated, this spiral groove is positioned at a spaced location from the lip 40. This feature is indicated more clearly in FIG. 4 which indicates a spacing 46 between the groove 42 and the lip 40. While the principal portion of the spiral groove is spaced from the lip 40 as illustrated in FIG. 2, the terminal end portion of the groove on the trailing face of the cutting blade terminates on the lip 40 in certain embodiments.

The cross-sectional outline of the spiral groove 42 can assume various geometries. In the illustrated embodiment, the cross-sectional outline is substantially arcuate and allows a portion of the material to be drilled to initially pass through the spiral groove during the drilling operations as the drill is fed into the work piece. This portion of material which passes through the spiral groove is at least partially cut by the subsequent pass of the cutting edge, for example, the cutting edge 30 in FIG. 2 of the further cutting blade 22. Thus, the shavings of the work piece material are cut into thin ribbons or grains that more readily roll out of or move along the length of the flutes of the twist drill during the cutting operation. Further, this feature reduces tool sharpening and assists in equalizing the cutting operation performed by each of the cutting edges of the tip.

Another feature of the present invention is to provide a twist drill in which the flutes are enlarged by removing a portion of the cutting blade proximate the trailing face of each of the blades thereby diminishing the effective width of such blades. This feature is illustrated by the phantom line indicated at 48 in FIG. 2 which would be the counter part to the edge 48' of the trailing face 46. Thus, by shifting the trailing face edge from the location indicated at 48' to the location indicated by 48, and removing the material from the twist drill associated with such shift, the effective size of the flute 50 defined by the trailing face 46 of the cutting blade 24 and the leading face 26 of the cutting blade 22, is increased. Similarly, the size of the flute defined between the trailing face 52 of the flute 22 and the leading face 54 of the flute 24 will be enlarged.

In the embodiment illustrated in FIG. 4, a pair of spiral grooves extend from the leading face of each cutting edge at a spaced location from the respective cutting lip 40 and 40' of the cutting edge to the trailing face of the cutting blade tip. The spiral grooves as illustrated in FIG. 4 are spaced at different locations from their respective cutting lip of the cutting tip thereby staggering the grooves to allow material at different depths within the bore being drill to be passed therethrough. Material passing through the groove is at least partially cut by a subsequent pass of the associated cutting blade.

FIG. 5 illustrates another embodiment of a twist drill constructed in accordance with the present invention in which the leading cutting edge of the twist drill 60 forms a preselected obtuse angle A with the longitudinal axis of the twist drill and the trailing cutting edge 62 forms an obtuse angle B with the longitudinal axis of the cutting edge which is greater than the angle A. In this connection, the cutting edge 60 is the leading cutting edge and contacts material to be cut prior to such material being contacted by the cutting edge 62, the trailing cutting edge.

FIG. 6 illustrates a still further embodiment of the present invention in which the cutting edge 60' and 62' form identical obtuse angles with the longitudinal axis of the twist drill above the line 64. The cutting edge 62' below the line 64' forms a larger obtuse angle with a longitudinal axis of the twist drill. In this connection, inasmuch as the terminal tip portion of the twist drill is symmetric, the drill is less likely to deviate from the axis of the hole yet the trailing edge portion 62' below the line 64 is recessed such that the cutting edge 60' forms the principal or leading cutting edge.

From the foregoing detailed description, it will be recognized that a twist drill incorporating various improvements over known prior art has been described and illustrated. For example, the twist drill of the present invention is designed to assist in reducing the heat generated during drilling operation. Also, the shavings produced by the material cut from the work piece are of a smaller size and shape such that they more readily move along the length of the flutes out of the holes being drilled. In one embodiment, the spiral grooves provided on the cutting edge of the tip portion of the twist drill are staggered such that portions of material passing through these grooves are cut by the subsequent passes of the operably associated cutting edge that follows.

Various modifications of the illustrated embodiments could be made without departing from the scope of the invention. Accordingly, the scope of the invention is limited only by the attached claims or equivalents thereof.

I claim:

1. An improved twist drill which comprises:

a pair of spiral flutes, joined by a central web, extending from a shank at a first end of said drill to first and further cutting blades at a further end of said drill, each of said cutting blades extending radially from a chisel point on the axis of said drill to a cutting lip at the peripheral edge of said flutes, each of said cutting blades defining a leading cutting edge and a trailing cutting edge;

said first cutting blade being provided with a nonconverging groove spiralling about said axis of said drill across said first cutting blade from said leading cutting edge to said trailing edge thereof at a selected position between, but removed from, said chisel point and said cutting lip of said first cutting blade;

said groove defining an inner edge toward said chisel point and an outer edge toward said cutting lip of said first blade, said inner edge having no portion at a greater radius from said axis of said drill than said inner edge at said leading cutting edge, and said outer edge of said groove having no portion at a smaller radius from said axis of said drill than said outer edge of said groove at said leading cutting edge;

said further cutting blade having an inner portion toward said chisel point and an outer portion toward said cutting lip of said further cutting blade, said inner portion forming a symmetrical angle with said axis of said drill corresponding with said first cutting blade, and said outer portion of said further cutting blade forming an angle with said axis less than the angle of said inner portion of said further blade with said axis; and wherein the length of said outer portion of said further cutting blade, along said further cutting blade, is substantially equal to the distance between said outer edge of said groove and said cutting lip of said first cutting blade.

2. The improved twist drill of claim 1 wherein said selected position is substantially midway between said chisel point and said cutting lip of said first cutting blade.

3. The improved twist drill of claim 1 wherein said groove has a U-shaped cross-section.

4. The improved twist drill of claim 1 wherein said groove has a diverging cross-section between said leading cutting edge and said trailing edge.

5. The improved twist drill of claim 1 wherein said groove has a V-shaped cross-section with one side of said V-shaped groove substantially perpendicular to said axis and a further side of said V-shaped groove substantially parallel to said axis.

6. The improved twist drill of claim 1 wherein lands at the peripheral edges of said flutes are reduced in thickness by symmetrically removing material from the trailing surface of each of said flutes toward said web thereby symmetrically reducing the width of said cutting blades from said chisel point toward said peripheral cutting lip.

* * * * *